(12) United States Patent
Espinoza et al.

(10) Patent No.: US 7,276,540 B2
(45) Date of Patent: Oct. 2, 2007

(54) SUPPORTS FOR HIGH SURFACE AREA CATALYSTS

(75) Inventors: Rafael L. Espinoza, Ponca City, OK (US); Dan Fraenkel, Ponca City, OK (US); Kevin L. Coy, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 305 days.

(21) Appl. No.: 10/706,202

(22) Filed: Nov. 12, 2003

(65) Prior Publication Data

US 2004/0132832 A1 Jul. 8, 2004

Related U.S. Application Data

(60) Provisional application No. 60/425,383, filed on Nov. 11, 2002.

(51) Int. Cl.
*C07C 27/00* (2006.01)

(52) U.S. Cl. ............... 518/715; 518/712; 518/713; 518/717; 518/718

(58) Field of Classification Search ............... 518/700, 518/712, 715, 713, 717, 718
See application file for complete search history.

(56) References Cited

U.S. PATENT DOCUMENTS

| 3,423,194 | A | 1/1969 | Kearby | 48/214 |
|---|---|---|---|---|
| 6,214,890 | B1 | 4/2001 | Roy et al. | |
| 6,255,358 | B1 | 7/2001 | Singleton et al. | 518/715 |
| 6,262,132 | B1 | 7/2001 | Singleton et al. | |
| 6,465,530 | B2 * | 10/2002 | Roy-Auberger et al. | 518/715 |
| 6,586,481 | B2 | 7/2003 | Pederzani et al. | 518/715 |
| 6,638,889 | B1 | 10/2003 | Van Berge et al. | |
| 2001/0031793 | A1 * | 10/2001 | Singleton et al. | 518/715 |
| 2002/0037937 | A1 | 3/2002 | Raje et al. | 518/715 |
| 2003/0130361 | A1 | 7/2003 | Lednor et al. | 518/715 |

FOREIGN PATENT DOCUMENTS

WO WO 02/07883 A2 1/2002

OTHER PUBLICATIONS

PCT International Search Report for Application No. PCT/US03/35901, dated May 1, 2004 (2 p.).
S. T. Sie, et al.; "Fundamentals and selection of advanced Fischer-Tropsch reactors"; Applied Catalysis 1999, A: General, 186, pp. 51-64.

* cited by examiner

*Primary Examiner*—J. Parsa
(74) *Attorney, Agent, or Firm*—Conley Rose P.C.

(57) ABSTRACT

The present invention relates to thermally stable, high surface area alumina supports and a method of preparing such supports with at least one modifying agent. The method includes adding an aluminum modifying agent to the alumina prior to calcining. The inventive support has thermal stability at temperatures above 800° C. A more specific embodiment of the invention is a catalyst having a high surface area, thermally stable alumina support with at least one group VIII metal or rhenium and an optional promoter loaded onto the support. The present invention further relates to gas-to-liquids conversion processes, more specifically for producing $C_{5+}$ hydrocarbons.

44 Claims, 2 Drawing Sheets

SUPPORTS FOR HIGH SURFACE AREA CATALYSTS

CROSS-REFERENCE TO RELATED APPLICATIONS

This non-provisional application claims the benefit of U.S. Provisional Application No. 60/425,383, filed Nov. 11, 2002, which is hereby incorporated by reference in its entirety.

TECHNICAL FIELD OF THE INVENTION

The present invention generally relates to catalyst supports having high surface area and stability in high temperature and/or hydrothermal conditions. This invention more particularly relates to modified alumina supports and catalysts made therefrom that maintain high surface areas at hydrothermal and/or high temperature reaction conditions. The present invention also relates to processes employing these catalysts for the conversion of synthesis gas to hydrocarbons. This invention also discloses methods of making such supports and catalysts.

BACKGROUND OF THE INVENTION

It is well known that the efficiency of catalyst systems is often related to the surface area on the support. This is especially true for systems using precious metal catalysts or other expensive catalysts. Therefore, the greater the catalyst surface area typically results in more catalytic material exposed to the reactants, which further typically results in less time and catalytic material needed to maintain a high rate of productivity.

Alumina ($Al_2O_3$) is a well known support for many catalyst systems. It is also well known that alumina has a number of crystalline phases, for example alpha alumina (often noted as α-alumina or $\alpha$-$Al_2O_3$), gamma alumina (often noted as γ-alumina or $\gamma$-$Al_2O_3$) and others. One of the properties of gamma alumina is that it has a very high surface area. This is commonly believed to be because the aluminum and oxygen molecules are in a crystalline structure or form that is typically not densely packed. Unfortunately, when gamma alumina is heated to high temperatures, the structure of the atoms typically collapses, which results in a substantial surface area decrease. The most dense crystalline form of alumina is alpha alumina. Thus, alpha alumina has the lower surface area but is the most stable at high temperatures.

Alumina can be used as supports and/or catalysts for many heterogeneous catalytic processes. Some of these catalytic processes occur under conditions of high temperature, high pressure and/or high water vapor pressure.

It has long been a desire of those skilled in the catalyst support arts to create a form of alumina that has high surface area like gamma alumina and stability at high temperatures like alpha alumina.

Such a catalyst support would have many uses. One such use is in catalytic reactions that produce high temperature water vapor at high partial pressures. Such an environment challenges the hydrothermal stability of alumina supports making the supports more prone to degradation, fragmentation, or other processes that compromise the ability to support catalytic metals. Hydrothermal stability typically comprises the property of resisting morphological and/or structural change in the face of elevated heat and water vapor pressure.

The Fischer-Tropsch process (also called the Fischer-Tropsch reaction or Fischer-Tropsch synthesis) is an example of a process that can generate water vapor of high partial pressure at high temperatures. In the Fischer-Tropsch process, carbon monoxide and hydrogen are converted into a mixture of organic molecules containing carbon and hydrogen. Those organic molecules containing only carbon and hydrogen are known as hydrocarbons. In addition, other organic molecules containing oxygen in addition to carbon and hydrogen, oxygenates, may be formed during the Fischer-Tropsch process. Hydrocarbons having carbons with no ring formation are known as aliphatic hydrocarbons and may include paraffins and/or olefins. High molecular weight paraffins are particularly desirable as the basis of synthetic diesel fuel.

Typically, the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a liquid fuel it is desirable to obtain primarily hydrocarbons that are liquids and waxes, that are nongaseous hydrocarbons (i.e., $C_{5+}$ hydrocarbons that comprise 5 carbons or more).

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors. In a batch process, the reactor is closed to introduction of new feed and exit of products. In a continuous process, the reactor is open, with an inflow containing feed, termed a feed stream, passed into the reactor and an outflow containing product, termed a product stream, passed out of the reactor.

Common reactors include packed bed (also termed fixed bed) reactors and slurry bed reactors. Originally, the Fischer-Tropsch synthesis was carried out in packed bed reactors. These reactors have several drawbacks, such as temperature control, that can be overcome by gas-agitated agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Gas-agitated multiphase reactors or slurry bubble column reactors (SBCRs) inherently have very high heat transfer rates; therefore, reduced reactor cost and the ability to remove and add catalyst online are principal advantages of such reactors in Fischer-Tropsch synthesis, which is exothermic. Sie and Krishna (Applied Catalysis A:

General 1999, 186, p. 55), incorporated herein by reference in its entirety, give a history of the development of various Fischer-Tropsch reactors.

Typically, in the Fischer-Tropsch synthesis, the distribution of weights that is observed such as for $C_{5+}$ hydrocarbons, can be described by likening the Fischer-Tropsch reaction to a polymerization reaction with an Anderson-Shultz-Flory chain growth probability ($\alpha$) that is independent of the number of carbon atoms in the lengthening molecule. $\alpha$ is typically interpreted as the ratio of the concentration of $C_{n+1}$ product to the concentration of $C_n$ product. A value of $\alpha$ at least 0.72 is preferred for producing high carbon-length hydrocarbons, such as those of diesel fractions.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, as found in, for example, the CRC Handbook of Chemistry and Physics, $81^{rst}$ Edition, D. R. Lide, Ed., CRC Press, Inc., 2000–2001, and used throughout this specification as the reference for all element group numbers).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a water-gas shift activity by which carbon monoxide reacts with by-product water to produce hydrogen and carbon dioxide. Ruthenium has the advantage of high activity but unfortunately is quite expensive. Consequently, although ruthenium is not the economically preferred catalyst for commercial Fischer-Tropsch production, it is often used in low concentrations as a promoter with cobalt as the catalytic metal.

Thus, catalysts often further employ a promoter in conjunction with the principal catalytic metal. A promoter typically improves a measure of the performance of a catalyst, such as productivity, lifetime, selectivity, reducibility, or regenerability. Further, in addition to the catalytic metal, a Fischer-Tropsch catalyst includes a alumina support material, e.g., alumina and/or other refractory oxides.

The method of preparation of a catalyst may influence the performance of the catalyst in the Fischer-Tropsch reaction. In a common method of loading a Fischer-Tropsch metal to an alumina support, the alumina support is impregnated with a solution containing a dissolved metal-containing compound. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. The catalyst precursor is then typically reduced in hydrogen to convert the oxide compound to reduced "metallic" metal. When the catalyst includes a promoter, the reduction conditions may cause reduction of the promoter, or the promoter may remain as an oxide compound. Despite the vast knowledge of preparation techniques, there is ongoing effort for improving methods of catalyst preparation. For instance, drawbacks to using the alumina supports and/or other refractory oxides include attrition of the supports during Fischer-Tropsch reaction conditions and attenuation of the Fischer-Tropsch catalyst conversion activity.

Consequently, there is a need for a hydrothermally-stable high surface area support for use in the catalytic production of hydrocarbons. Further needs include an improved alumina support. Additional needs include a Fischer-Tropsch catalyst having improved conversion activity and stability. In addition, existing needs include an improved process for the production of hydrocarbons using an alumina supported catalyst.

SUMMARY OF THE INVENTION

The present invention is a thermally stable, high surface area alumina support with at least one modifying agent comprising aluminum. The modifying agent comprises at least one element with an atomic volume preferably between about 6 $cm^3$/mol and about 14 $cm^3$/mol, more preferably between about 8 $cm^3$/mol and about 12 $cm^3$/mol, and most preferably between about 9 $cm^3$/mol and about 11 $cm^3$/mol. The modifying agent may comprise an element oxide with a molecular volume preferably no greater than that of aluminum oxide, more preferably between about 10 $cm^3$/mol and about 25.7 $cm^3$/mol. Preferably, the modifying agent comprises at least one element selected from the group consisting of aluminum, its corresponding oxides, alkoxides, hydroxides, and ions. Preferably, the modifying agent comprises aluminum salt, dispersible boehmite, dispersible pseudo-boehmite or mixtures thereof.

The present invention also includes a process for stabilizing a high surface area alumina support. The process for stabilizing the support includes adding a precursor of at least one modifying agent comprising at least one element with an atomic volume preferably between about 6 $cm^3$/mol and about 14 $cm^3$/mol, more preferably between about 8 $cm^3$/mol and about 12 $cm^3$/mol, and most preferably between about 9 $cm^3$/mol and about 11 $cm^3$/mol to a transition alumina prior to calcining. Preferably, the precursor of at least one modifying agent includes an alumina salt and/or a hydroxide of aluminum, and the transition alumina comprises gamma-alumina. Calcining is preferably accomplished at temperatures between 500 and 900° C.

The invention further includes a catalyst comprising a catalytically active metal on an alumina support wherein the support includes at least one modifying agent comprising at least one element with an atomic volume preferably between about 6 $cm^3$/mol and about 14 $cm^3$/mol, more preferably between about 8 $cm^3$/mol and about 12 $cm^3$/mol, and most preferably between about 9 $cm^3$/mol and about 11 $cm^3$/mol. The modifying agent may also comprise an element oxide with a molecular volume preferably no greater than that of aluminum oxide, more preferably between about 10 $cm^3$/mol and about 25.7 $cm^3$/mol. Preferably, the support includes at least one element selected from the group consisting of aluminum, its corresponding oxides, alkoxides, hydroxides, and ions, preferably aluminum ions or an oxide of aluminum.

The present invention can be more specifically seen as a support, process and catalyst wherein the preferred modifying agent of the catalyst support comprises aluminum, its oxides, alkoxides, hydroxides, ions, or combinations thereof, and wherein the preferred modifying agent is applied to the support by using a precursor comprising an aluminum salt and/or boehmite. The supported catalyst comprises at least one metal from Groups 8, 9, and 10 of the Periodic Table (new IUPAC notation) with one or more optional promoters.

A more specific embodiment of the invention is a catalyst having a high surface area, thermally stable alumina support modified with an aluminum-comprising precursor with at least one metal from Groups 8, 9, and 10 of the Periodic Table and an optional promoter loaded onto the modified alumina support.

The present invention further relates to Fischer-Tropsch catalysts and processes for the conversion of syngas for producing primarily $C_{5+}$ hydrocarbons.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed understanding of the preferred embodiments, reference is made to the accompanying drawings, wherein.

DETAILED DESCRIPTION OF PREFERRED EMBODIMENTS

Herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the specifically expressed methods or compositions contained herein. In particular, various embodiments of the present invention provide a number of different configurations of the overall gas to liquid conversion process.

THE MODIFYING AGENT

The present invention provides catalysts supported by an aluminum-modified alumina support having enhanced thermal stability and BET surface area. The modified alumina support is obtained by deposition of a modifying agent precursor comprising aluminum onto an alumina support. The modifying agent precursor can comprise the form of salt, acid, oxide, hydroxide, acetylacetonate, lactate oxyhydroxide, alkoxide carbide, and the like. Preferably, the modifying agent precursor can comprise an aluminum salt, a hydroxide or aluminum, or combinations thereof. The modifying agent may comprise the form of aluminum ions, an oxide of aluminum, or combinations thereof, when incorporated in the support. Without limiting the invention, examples of suitable salts include carbonate, acetate, acetyl acetonate, lactate, halides such as nitrate and chloride, oxalate, or mixtures thereof. Without limiting the invention, examples of suitable aluminum hydroxides include boehmite, pseudo-boehmite, gibbsite, or mixtures thereof. More preferably, the modifying agent precursor comprises aluminum nitrate, aluminum lactate, aluminum acetate, boehmite, pseudo-boehmite, or mixtures thereof. The boehmite can be modified by addition of at least one modifier element selected from the group consisting of cobalt, silicon, selenium, zirconium, alkaline earth metals, rare earth metals, and the like. The boehmite is preferably modified by at least one element with an atomic volume preferably between about 6 cm$^3$/mol and about 14 cm$^3$/mol, most preferably between about 8 cm$^3$/mol and about 12 cm$^3$/mol, and more preferably between about 9 cm$^3$/mol and about 11 cm$^3$/mol. The boehmite and/or pseudo-boehmite can be dispersible or non-dispersible, preferably dispersible. Dispersible boehmite comprises a crystallite size of from about 3 nm to about 100 nm, preferably from about 3 nm to about 15 nm.

The support can be modified by at least one additional modifying agent. The additional modifying agent comprises at least one element selected from the group consisting of boron, silicon, gallium, selenium, rare earth metals, transition metals, alkali earth metals, their corresponding oxides, alkoxides, hydroxides, and ions, and combinations thereof. Preferably, the additional modifying agent comprises at least one element selected from the group consisting of boron (B), silicon (Si), gallium (Ga), selenium (Se), calcium (Ca), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), zirconium (Zr), iron (Fe), cobalt (Co), manganese (Mn), magnesium (Mg), their corresponding oxides, alkoxides, hydroxides, ions, and combinations thereof. More preferably, the additional modifying agent comprises at least one element selected from the group consisting of La, Sm, Pr, Ce, Eu, Yb, Si, Ce, Mg, Ca, Mn, Co, Fe, Zr, their corresponding oxides, alkoxides, hydroxides, ions, and combinations thereof. Still more preferably, the additional modifying agent comprises an oxide of one element selected from the group consisting of La, Sm, Pr, Ce, Eu, Yb, Si, Ce, Mg, Ca, Mn, Co, Fe, and Zr.

THE SUPPORT

The present invention provides a method of making an aluminum-modified alumina support with a modifying agent comprising aluminum. The support comprises at least a majority of alumina. The support can be in the shape of monoliths, particles, and the like. Monoliths typically comprise any singular piece of material of continuous manufacture such as pieces of metal or metal oxide, foam materials, or honeycomb structures. The particles may comprise granules, beads, pills, pastilles, pellets, cylinders, trilobes, extrudates, spheres or other rounded shapes, or another manufactured configuration. Alternatively, the particles may be irregularly shaped. When used in a fixed bed reactor, at least a majority (i.e., >50%) of the particles preferably have a maximum characteristic length (i.e., longest dimension) of less than six millimeters, more preferably less than three millimeters, and most preferably less than 0.5 millimeter. When used in a slurry or fluidized bed reactor, at least a majority (i.e., >50%) of the particles should have a maximum characteristic length (i.e., longest dimension) of less than 0.5 millimeters, preferably less than 300 microns. More preferably, the particle size should be between about 10 microns to about 250 microns for a slurry bed reactor.

After heat treatment, the aluminum-modified alumina support has a high BET surface area. When the heat treatment is between 400 and 800° C., the aluminum-modified alumina support has a BET surface area of at least about 40 m$^2$/g, preferably at least about 60 m$^2$/g, more preferably at least about 80 m$^2$/g.

THE CATALYST

Destabilization of the support is not the sole cause of catalyst deactivation. Stabilizing the catalytically active species on a stable support is also needed. When an active species is supported on an oxide support, solid state reactions between the active species and the oxide support can take place at high temperatures, which can create some instability. Metal atoms often nucleate on defect sites at oxide surfaces, therefore highly defective surfaces create more metal-support interactions. Thus, metal-support interactions could be decreased using an inorganic oxide support with a lower amount of defect sites. It is theorized that the mode of stabilization of the modifying agent may be by changing the atomic arrangement in the alumina crystal lattice especially within the alumina outer surface layer, i.e., blocking its defect sites so as to create an alumina outer surface with low defects on which an active metal is deposited. Without wishing to be bound to this theory, the Applicants believe that the modification of a transition alumina, particularly gamma-alumina, by at least one element with an atomic volume equal or close to that of aluminum and/or an element oxide with a molecular volume not exceeding that of aluminum oxide may cause (i) a stabilization of the alumina by blocking its defect sites, thus blocking the formation of active metal "aluminate" in the catalyst made therefrom, and/or (ii) a minimization of the impact of water vapor in modifying the surface properties of alumina, thereby decreasing the ease of active metal reaction with the alumina support. It is hypothesized that, because the size of the modifier element comprising particularly aluminum closely approaches the available space in these alumina defect sites than other "conventional" modifying agents, the introduction of these aluminum sites does not disturb the crystal lattice while creating a less defective surface on which the active metal deposits.

The catalyst comprises any suitable metals that exhibit catalytic activity in the conversion of synthesis gas to hydrocarbons. The catalytic metal is preferably a Fischer-Tropsch catalytic metal. In particular, the catalytic metal is preferably selected from among the Group 8 elements of the Periodic Table, such as iron (Fe), ruthenium (Ru), and osmium (Os); Group 9 elements, such as cobalt (Co), rhodium (Rh), and iridium (Ir); Group 10 elements, such as nickel (Ni), palladium (Pd), and platinum (Pt); and the metals molybdenum (Mo), rhenium (Re), and tungsten (W). The catalytic metal more preferably comprises at least one of cobalt, iron, ruthenium, nickel, their corresponding oxides and ions and combinations thereof. The catalytic metal still more preferably comprises cobalt, iron, ruthenium, or mixtures thereof. Most preferably, the catalytic metal comprises cobalt. The catalyst preferably contains a catalytically effective amount of the catalytic metal. It is to be understood that the amount of catalytic metal present in the catalyst may vary widely.

It will be understood that, when the catalyst includes more than one supported metal, the catalytic metal, as termed herein, is the primary supported metal present in the catalyst. The primary supported metal is preferably determined by weight, wherein the primary supported metal is preferably present in the greatest % by weight.

The catalytic metal contained by a catalyst according to a preferred embodiment of the present invention is preferably in a reduced, metallic state before use of the catalyst in the hydrocarbon (i.e., Fischer-Tropsch) synthesis. However, it will be understood that the catalytic metal can be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

In alternative embodiments, the catalyst may comprise precursors of the active metals. The active metal precursor can be in the form of salt, acid, oxide, hydroxide, oxyhydroxide, carbide, and the like. It should be understood that more than one active metal or more than one active metal precursor can be used.

As used herein, the term "active metal loading" refers to the percent by weight of active metal in the catalyst, measured as the weight of active metal relative to the overall weight of the catalyst. Preferably, the active metal loading is between about 0.1 and 50 weight percent. When the active metal is cobalt, nickel, or iron, the metal active metal loading is between about 0.1 and 50 weight percent, preferably between about 5 and about 40 weight percent, and more preferably between about 10 and about 35 weight percent. When the active metal is ruthenium, the active metal loading is between about 0.1 and 10 weight percent, preferably between about 1 and about 8 weight percent, and more preferably between about 2 and about 5 weight percent.

Optionally, the present catalyst can also include at least one promoter known to those of ordinary skill in the art. The promoter may vary according to the catalytic metal. A promoter can be an element that also, in an active form, has catalytic activity in the absence of the catalytic metal. Such an element will be termed herein a promoter when it is present in the catalyst in a lesser wt. % than the catalytic metal. A promoter is preferably a Fischer-Tropsch promoter, which is an element or compound that enhances the performance of a Fischer-Tropsch catalyst in a Fischer-Tropsch process.

Suitable promoters vary with the catalytic metal and can be selected from Groups 1–15 of the Periodic Table of the Elements. A promoter can be in elemental form. Alternatively, a promoter can be present in an oxide compound. Further, a promoter can be present in an alloy containing the catalytic metal. Except as otherwise specified herein, a promoter is preferably present in an amount to provide a weight ratio of elemental promoter:elemental catalytic metal of from about 0.00005:1 to about 0.5:1, preferably from about 0.00005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal may be between about 0.00005:1 and about 0.05:1.

Further, when the catalytic metal is cobalt or iron, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and hafnium (Hf);

Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements such as gallium (Ga), indium (In), thallium (Tl), and boron (B); Group 14 elements such as tin (Sn) and lead (Pb); and Group 15 elements such as phosphorus (P), bismuth (Bi), and antimony (Sb).

When the catalytic metal is cobalt, iron, or combinations thereof, the promoter preferably comprises platinum, palladium, ruthenium, rhenium, silver, boron, copper, lithium, sodium, potassium, magnesium, or combinations thereof.

When the catalytic metal is cobalt, the promoter more preferably comprises rhenium, ruthenium, platinum, palladium, boron, silver, or combinations thereof.

When the cobalt catalyst includes rhenium, the rhenium is preferably present in the catalyst in an amount between about 0.001 and about 5% by weight, more preferably between about 0.01 and about 2% by weight, most preferably between about 0.2 and about 1% by weight.

When the cobalt catalyst includes ruthenium, the ruthenium is preferably present in the catalyst in an amount between about 0.0001 and about 5% by weight, more preferably between about 0.001 and about 1% by weight, most preferably between about 0.01 and about 1% by weight.

When the cobalt catalyst includes platinum, the platinum is preferably present in the catalyst in an amount between about 0.00001 and about 5% by weight, more preferably between about 0.0001 and about 1% by weight, and most preferably between about 0.0005 and about 1% by weight.

When the cobalt catalyst includes palladium, the palladium is preferably present in the catalyst in an amount between about 0.00001 and about 5% by weight, more preferably between about 0.0001 and about 2% by weight, most preferably between about 0.0005 and about 1% by weight.

When the cobalt catalyst includes silver, the catalyst preferably has a nominal composition including from about 0.01 to about 10 wt % silver, more preferably from about 0.07 to about 7 wt % silver, still more preferably from about 0.1 to about 5 wt % silver.

When the cobalt catalyst includes boron, the catalyst preferably has a nominal composition including from about 0.025 to about 2 wt % boron, more preferably from about 0.05 to about 1.8 wt % boron, still more preferably from about 0.075 to about 1.5 wt % boron.

By way of example and not limitations, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), and barium (Ba). When the catalytic metal is iron, the promoter more preferably comprises potassium, copper, lithium, sodium, silver, magnesium, or combinations thereof. When the catalytic metal is iron, the catalyst may include potassium or lithium as a promoter, and alternatively or in combination, the catalyst may include copper or silver.

When the iron catalyst comprises lithium as a promoter, lithium is present in an amount preferably between about 0.05 wt % and about 5 wt % of lithium to total weight of catalyst; and more preferably, between about 5 wt % and about 2 wt %.

When the iron catalyst comprises silver as a promoter, silver is present in an amount preferably between about 0.001 wt % and about 5 wt % of silver to total weight of catalyst; more preferably between about 0.001 wt % and about 2 wt % of silver to total weight of catalyst; and most preferably between about 0.005 wt % and 1 wt % of silver to total weight of catalyst.

When the iron catalyst comprises potassium as a promoter, potassium is present in an amount preferably between about 0.0001 wt % and about 10 wt % of potassium to total weight of catalyst; more preferably, between about 0.0005 wt % and about 1 wt % of potassium to total weight of catalyst; and most preferably, between about 0.0005 wt % and about 0.5 wt % of potassium to total weight of support.

When the iron catalyst comprises calcium as a promoter, calcium is present in an amount preferably between about 0.001 wt % and about 4 wt % of calcium to total weight of catalyst; more preferably, between about 0.5 wt % and about 3 wt % of calcium to total weight of catalyst.

When the iron catalyst comprises copper as a promoter, copper is preferably present in an amount to provide a nominal catalyst composition including between about 0.1 wt % and about 10 wt % copper.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% by weight, more preferably between about 0.01 and about 0.5% by weight, still more preferably between about 0.05 and about 0.5% by weight.

Further, as used herein, it will be understood that each of the ranges, such as of ratio or weight %, herein is inclusive of its lower and upper values.

In one embodiment of the present invention, the catalyst support is used for hydrogenation catalysts in the conversion of synthesis gas to alcohols or $C_{5+}$ hydrocarbons via the Fischer-Tropsch reaction. In addition, the present invention contemplates an improved method for converting hydrocarbon gas to liquid hydrocarbons using the novel synthesis gas conversion catalyst compositions described herein. Thus, the invention also relates to processes for converting hydrocarbon-containing gas to liquid products via an integrated synthesis gas to Fischer-Tropsch, methanol or other process.

METHOD OF PREPARATION OF CATALYST SUPPORT

The present invention presents a method of making a Fischer-Tropsch catalyst support wherein said method comprises depositing the modifying agent comprising aluminum onto an alumina precursor and calcining the deposited alumina precursor at high temperatures to form an aluminum-modified alumina support. The calcination temperature is preferably selected based on the highest temperature the catalyst would likely experience in operation, i.e. the catalytic reactor. Thus, if the catalytic system is anticipated to operate at a temperature above 800° C., the calcination temperature would be greater than 600° C., preferably between about 800° C. and 1,400° C., more preferably between about 900° C. and 1,300° C. If the catalytic system is anticipated to operate at 800° C. or less, the calcination range would preferably be between about 400° C. and 800° C., more preferably between about 450° C. and 750° C.

The alumina precursor can comprise one or more alumina phases. Alumina phases are well known in the art, and the present invention can include any suitable phase for use in synthesis gas conversion. Without limiting the present invention, examples of such alumina phases include gamma, delta, eta, kappa, chi, rho, theta, and alpha. An alumina precursor comprising at least one transition alumina is preferred. Transition alumina phases are so-called because they belong to a series of aluminas that can undergo transition to different aluminum oxide polymorphs. The known transition aluminas include gamma-alumina, delta-alumina, eta-alumina, kappa-alumina, chi-alumina, rho-alumina, and theta-alumina. Santos et al. (Materials Research, 2000, vol. 3 (4), pp. 104–114) disclosed the different standard transition aluminas using Electron Microscopy studies. An alumina precursor comprising mainly gamma alumina is most preferred.

It should be understood that the alumina precursor could be pre-treated to remove moisture, to remove undesirable impurities (such as nitrates), to make the support material stronger or to convert the alumina precursor to a desirable transition alumina phase, to change pore size, or to form a hydrated alumina material prior to deposition of the modifying agent and/or modifying agent precursor. The pre-treatment can comprise drying (to remove low amounts of moisture), spray drying (to remove high amounts of moisture), dehydrating (to remove excess moisture), steaming (to form a hydrated alumina material), treating with an acid (e.g., with nitric acid to change pore size), or "pre"-calcining (to make the support material stronger or to convert the alumina precursor to a desirable transition alumina phase). Steaming the alumina precursor can be done at conditions sufficient to transform the alumina precursor into a hydrated form of aluminum oxide, such as boehmite or pseudo-boehmite.

The modifying agent can be deposited into the alumina precursor by means of different techniques. Deposition techniques are well known in the art, and the modifying agent can be deposited on the alumina precursor by any suitable technique. Without limiting the invention, the deposition techniques can include spray-drying, impregnation (particularly incipient wetness impregnation), co-precipitation, chemical vapor deposition, plasma sputtering, and the like. It should also be understood that any combination of techniques or multiple steps of the same technique can be used to deposit a modifying agent. One preferred technique for depositing the modifying agent is impregnation, particularly incipient wetness impregnation. When the deposition is done via impregnation, optionally a drying step, such as in an oven, at temperatures between about 75° C. and about 150° C. is performed on the deposited alumina prior to calcination. Drying may also be performed by spray drying. Spray-drying comprises passing the deposited alumina through a spray-drier with an inlet temperature of from about 200° C. to about 425° C. and an outlet temperature of from about 100° C. to about 140° C. In large-scale preparations, the drying step preferably comprises at least one spray-drying step. When a modifying agent comprising aluminum and an additional modifying agent are deposited on the alumina precursor, precursors of both modifying agents can be applied simultaneously or sequentially.

It is also envisioned that the present process for preparing the stabilized alumina may comprise a steaming step before or after deposition of the modifying agent. As used herein, the term "steaming" refers to subjecting a given material, within the confines of an autoclave or other suitable device, to an atmosphere comprising a saturated or under-saturated water vapor at conditions of elevated temperature and elevated water partial pressure. In one aspect, the steaming of the alumina precursor (before or after deposition) is preferably performed at temperatures ranging from about 150° C. to about 500° C., more preferably ranging from about 180° C. to about 300° C., and most preferably ranging from about 200° C. to about 250° C.; a water vapor partial pressure preferably ranging from 1 bar to 40 bars, more preferably ranging form 4 bars to 20 bars, and most preferably from about 10 bars to 20 bars; and an interval of time preferably from 0.5 hour to 10 hours, and most preferably 0.5 hour to 4 hours. Preferably, under these steaming conditions, the alumina precursor is at least partially transformed to boehmite, pseudo-boehmite and/or combinations thereof. Pseudo-boehmite alumina refers to a monohydrate of alumina having a crystal structure corresponding to that of boehmite but having low crystallinity or ultra-fine particle size. When the modifying agent comprises dispersible boehmite, the calcination preferably occurs at temperatures above about 250° C., more preferably from about 250° C. to about 900° C. The dispersible boehmite is preferably impregnated into the pores of the alumina precursor. The dispersible boehmite is preferably modified by impregnation with at least one modifying metal. Alternative embodiments include a series of dispersible boehmite impregnations. Alternatively, the optional steaming of the alumina precursor (deposited or not) may comprise the same conditions of temperature and time as discussed above but with a reduced water vapor partial pressure preferably ranging form 1 bar to 5 bars, and more preferably ranging from 2 bars to 4 bars.

The present process for preparing alumina-modified alumina further comprises calcining the deposited alumina precursor at conditions sufficient to transform the deposited alumina precursor into the aluminum-modified alumina. Preferably, at least a portion of the modifying agent precursor comprising aluminum converts to aluminum oxide after calcination. More preferably, substantially all of the modifying agent precursor comprising aluminum converts to aluminum oxide after calcination.

In an alternative embodiment, the aluminum-modified alumina support is derived by contacting the alumina precursor with a precursor of the modifying agent comprising aluminum by mixing the alumina precursor and the modifying agent precursor in a solvent so as to form a sol. The solvent can comprise water and/or an organic solvent such as methanol, acetone, toluene, and ethanol. The sol is dried (in an oven or in a spray drier) to form the support material. When the solvent comprises water, the pH of the sol should be below about 7. Preferably, the pH of the sol is between about 3 and about 7 and more preferably between about 4 and about 6. Acids or acidic solutions, such as acetic acid, nitric acid, formic acid, boric acid, or combinations thereof can be added to the sol in order to adjust the pH of the sol. The Applicants believe that acids act as peptizing agents, which strengthen the molecular structure of the material by creating shorter bonds between molecules and tightening the structural lattice. The acidic condition during drying (conventionally drying or spray drying) should then confer greater structural integrity to the support. Drying the sol preferably occurs at a temperature between about 75° C. and about 200° C., more preferably between about 80° C. and about 150° C. Typically, drying proceeds for from 0.5 to 36 hours at a pressure of from 0 atm to about 10 atm, more preferably from about 1 to about 5 atm, most preferably at about 1 atm. In combination with drying, the method should include calcining the dried sol, preferably in an oxidizing atmosphere. The calcining conditions include a temperature between about 300° C. and about 900° C., preferably about 400° C. and about 900° C., more preferably between about 500° C. and about 800° C. Typically, the calcining proceeds from 0.5 to 36 hours at a pressure of about 0 atm, more preferably from about 1 atm to about 5 atm, most preferably at about 1 atm. The calcining in an oxidizing atmosphere preferably achieves oxidation of any deposited structural modifier in the form of salt to an oxide form. Further, this treatment preferably proceeds at a temperature less than the temperature at which loss of support surface area is appreciable. It is believed that at temperatures above 900° C., loss of support surface area is appreciable. It should be understood that more than one modifying agent precursor comprising aluminum (for instance a combination of aluminum salts, i.e., as example, aluminum nitrate, lactate, acetate, and the like) can be added to the sol. It should also be noted that a precursor of an additional modifying agent not comprising aluminum (such as silicon, cobalt, magnesium, lanthanum, and the like) can be added to the sol. Alternatively, the additional modifying agent can be incorporated into the support by means of the aforementioned deposition techniques. Alternatively, two or more modifying agents can be incorporated into the support by means of the aforementioned techniques.

Figure 1:
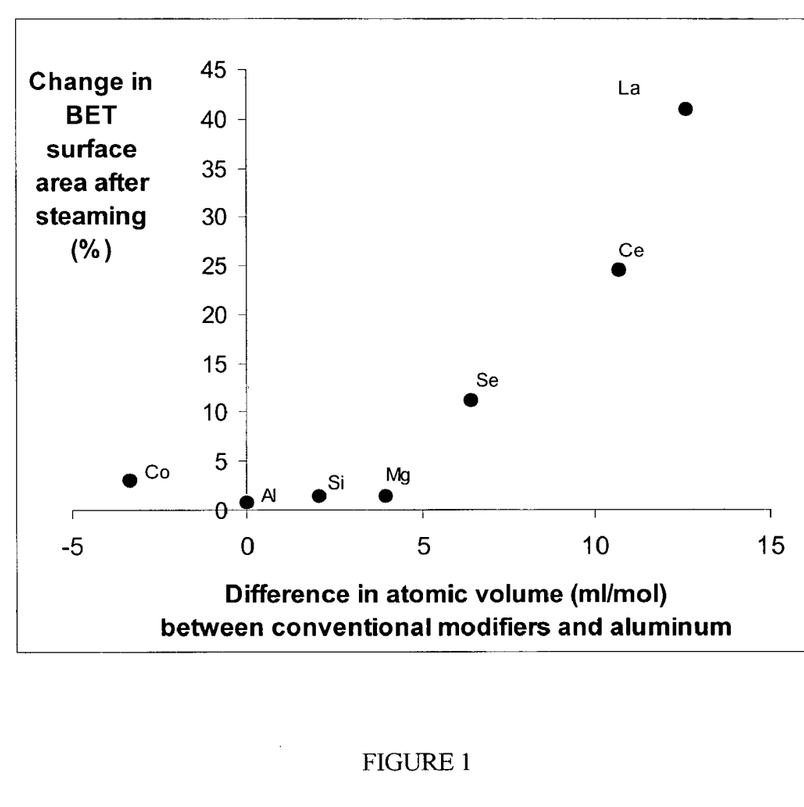
FIG. 1 illustrates the percent change in BET surface area after steaming for various modified alumina supports with respect to the difference in atomic volume between conventionally used modifier elements and aluminum.

FIG. 1 illustrates the influence of the atomic volume of the modifying agents on the hydrothermal stability of alumina supports modified by such modifying agents by comparing the change in surface area after steaming between an aluminum-modified alumina support and alumina supports modified by conventional modifying agents. FIG. 1 illustrates the percent change in BET surface area of aluminum-modified and conventionally-modified alumina supports with respect to the difference in atomic volumes between various modifying agents and aluminum. The atomic volume is the volume of one mole of an element in a condensed phase—one mole of a solid or a liquid, and is reported in units of $cm^3/mol$. Atomic volumes of the elements are calculated as the ratio of the element atomic weight by the element density.

As shown, the aluminum-modified support exhibits the smallest percent change in BET surface area after steaming. It should be noted that the modifying elements, which have a small atomic volume difference compared to aluminum, such as Co, Mg, and Si, seem to have reasonable hydrothermal stability (BET change of less than 5%), approaching that of an aluminum-modified alumina support. Therefore, it is theorized by the inventors that the atomic volume of a modifying agent should be between about 6 $cm^3/mol$ and about 14 $cm^3/mol$ in order to achieve reasonable hydrothermal stability, preferably between about 8 $cm^3/mol$ and about 12 $cm^3/mol$, more preferably between about 9 $cm^3/mol$ and about 11 $cm^3/mol$, still more preferably at about 10 $cm^3/mol$.

Figure 2:
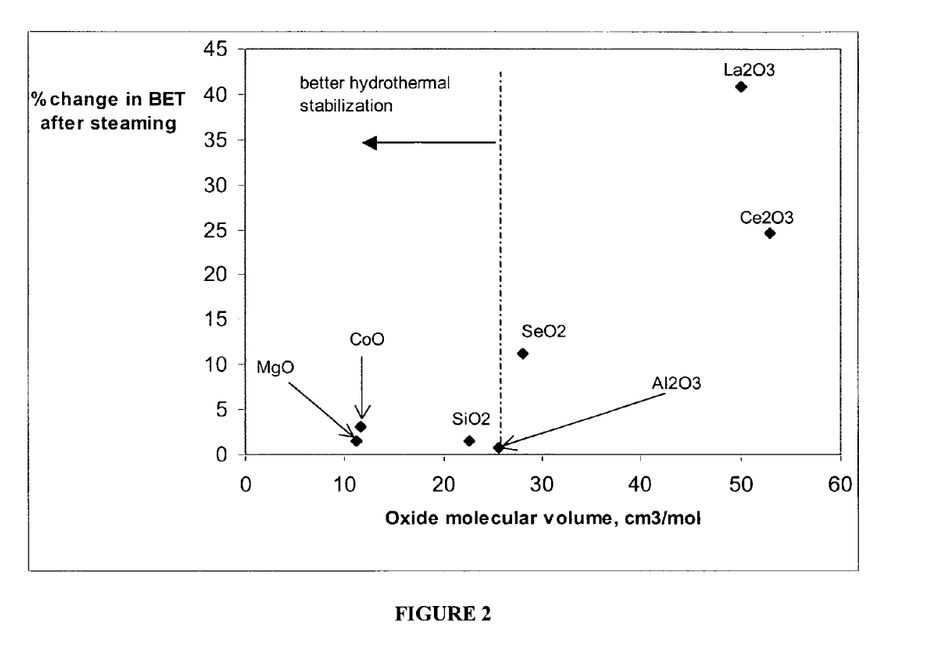
FIG. 2 illustrates the percent change in BET surface area after steaming for various modified alumina supports with respect to the molecular volume of modifying agents comprising element oxides.

If it assumed that the modifying agent is in the form of an element oxide in the modified support, the results in FIG. 2 indicate that the molecular volume of the element oxide (which may be derived from the modifying agent precursor comprising the element and used to modify the starting alumina precursor) may be a determining factor in achieving good hydrothermal stability in the modified alumina support. FIG. 2 illustrates the percent change in BET surface area after steaming of aluminum-modified and other modified alumina supports with respect to the molecular volumes between various element oxides and aluminum oxide. The molecular volume should represent the volume of one mole of an element oxide and is calculated as the ratio of the element oxide molecular weight by the element oxide density. When the data is illustrated in FIG. 2, it is noticeable that a small change in BET surface area after the steaming test is observed with elements Co, Si, Mg, and Al, which have a molecular volume of their corresponding element oxide equal to or lower than that of aluminum oxide that is between about 10 and about 25.7 $cm^3/mol$. On the other end, when the modifying agent comprises an element, with an element oxide that could have a molecular volume exceeding that of aluminum oxide (greater than ca. 25.7 $cm^3/mol$), the modified alumina support has poorer maintenance of its surface area under hydrothermal conditions (a BET change greater than 10%). Thus, an element with a corresponding element oxide of a molecular volume greater than that of aluminum oxide (i.e., >25.7 $cm^3/mol$) appears to be less suited for hydrothermal stabilization of alumina. Hence, it is believed that a modifying element comprising any element, for which an element oxide with a molecular volume less or equal to that of aluminum oxide (ca. 25.7 $cm^3/mol$) can be formed during preparation of the modified alumina support, should be selected in order to achieve good hydrothermal stability in the modified alumina support.

METHOD OF CATALYST PREPARATION

The present catalysts can be prepared by any of the methods known to those of ordinary skill in the art. By way of illustration and not limitation, methods of preparing a supported catalyst include impregnating a catalyst material onto the support, extruding the support material together with catalyst material to prepare catalyst extrudates, spray-drying the catalyst material and the support from a solution containing both, and/or precipitating the catalyst material onto a support. Accordingly, the supported catalysts of the present invention can be used in the form of powders, particles, pellets, monoliths, honeycombs, packed beds, foams, and aerogels. The catalyst material can include any one or combination of a catalytic metal, a precursor compound of a catalytic metal, a promoter, and a precursor compound of a promoter.

The present invention includes a method of making a Fischer-Tropsch catalyst wherein said method comprises optionally depositing a compound or precursor of one or more promoters to an aluminum-modified alumina support and calcining the (deposited) aluminum-modified alumina support at temperatures greater than about 250° C., preferably between about 300° C. and about 800° C., to form a catalyst precursor, depositing a compound or precursor of one or more active metals to the catalyst precursor; calcining the deposited catalyst precursor at temperatures between about 250° C. and about 800° C., preferably between about 300° C. and about 800° C. In alternative embodiments, calcining the deposited catalyst precursor is at temperatures between about 800° C. and about 900° C. In other alternative embodiments, calcining the (deposited) aluminum-modified alumina supports is at temperatures between about 800° C. and about 900° C. Preferably, the promoter comprises at least one element selected from the group consisting of platinum, palladium, ruthenium, rhenium, silver, boron, copper, lithium, sodium, potassium, magnesium, and combinations thereof. The compound or precursor of the promoter can comprise the form of salt, acid, oxide, hydroxide, oxyhydroxide, carbide, and the like. Preferably the compound or precursor of the promoter is a salt, which can include any element suitable for use as a Fischer-Tropsch promoter. Without limiting the invention, such salts can include nitrates, carbonates, halides such as chlorides, acetate, acetlyacetonates, and oxalates to name a few. If at least one promoter is used, preferably the deposition a compound or precursor of the at least one promoter is performed concurrently to the deposition of the compound or precursor of one or more active metals to an aluminum-modified alumina support.

Techniques for depositing the promoter into the modified alumina are well known in the art, and the present invention includes any such deposition techniques suitable for depositing the promoter into the modified alumina of the present invention. Without limiting the invention, the deposition techniques can include impregnation, co-precipitation, chemical vapor deposition, combinations thereof, and the like. The preferred technique for depositing the promoter is impregnation. When the promoter is deposited via impregnation, optionally a drying step at temperatures between about 75° C. and about 150° C. is performed on the deposited modified alumina prior to calcination.

Techniques for depositing the active metal on the catalyst precursor are well known in the art, and the present invention includes any such techniques suitable for deposition of the active catalyst into the promoted or unpromoted modified alumina. Without limiting the invention, deposition techniques can include impregnation, co-precipitation, chemical vapor deposition, and the like. The preferred technique for depositing the active metal is impregnation. When the deposition of the active metal is done via impregnation, optionally a drying step at temperatures between about 75° C. and about 150° C. is performed on the deposited catalyst precursor prior to calcination. It is to be understood that the catalyst of the present invention is not limited to comprising promoters but instead can be unpromoted.

One preferred method of preparing a catalyst by impregnating a catalyst material (catalytic metal or promoter element) onto a support includes impregnating the aluminum-modified alumina support with a solution containing the catalyst material. Suitable solvents include water and organic solvents (e.g., toluene, methanol, ethanol, and the like). Those skilled in the art will be able to select the most suitable solvent for a given catalyst material. The catalyst material can be in the form of a salt of a catalytic metal or promoter element. Thus, one method of preparing a supported metal catalyst is by incipient wetness impregnation of the aluminum-modified alumina support with a solution of a soluble metal salt. Incipient wetness impregnation preferably proceeds by solution of a catalytic metal compound (such as cobalt nitrate) in a minimal amount of solvent sufficient to fill the pores of the aluminum-modified alumina support. Alternatively, the catalyst material can be in the form of a zero valent compound of a catalytic metal or promoter element. Thus, another preferred method is to impregnate the aluminum-modified alumina support with a solution of zero valent metal such as cobalt carbonyl (e.g. $Co_2(CO)_8$, $Co_4(CO)_{12}$) or the like. Multiple steps of impregnation can be done to achieve the desired loading of the catalyst material (catalytic metal or promoter element) on the aluminum-modified alumina.

The impregnation of catalytic metal and any optional promoter on a support can proceed by multi-step impregnation, such as by two, three, or four impregnation steps. Each impregnation step can include impregnation of any one or combination of a catalytic metal and promoter. Each impregnation step can be followed by any of the above-described treatments of the impregnated support. In particular, each step of impregnating the support to form an impregnated support can be followed by treating the impregnated support to form a treated impregnated support. Thus, a multi-step impregnation can include multiple steps of drying and/or calcination. Each subsequent step of drying can proceed at a different temperature from any earlier steps of drying. Further, each subsequent step of calcination can proceed at a different temperature than the temperature used in any earlier steps of calcination. By way of example and not limitation, a multi-step impregnation can include calcining the support at a first temperature that is higher than the temperature for subsequent calcination. When the preparation of the catalyst proceeds via a multi-step impregnation of a catalytic metal on the aluminum-modified alumina support, any calcining of the catalyst precursor after any impregnation following the first one preferably proceeds at a temperature of not more than about 500° C., preferably not more than about 450° C., more preferably not more than about 350° C.

Another method of preparing a catalyst by impregnating a catalyst material onto the aluminum-modified alumina support includes impregnating the aluminum-modified alumina support with a molten salt of a catalytic metal or promoter. Thus, another method includes preparing the supported metal catalyst from a molten metal salt. One preferred method is to impregnate the aluminum-modified alumina support with a molten metal nitrate (e.g., $Co(NO_3)_2 \cdot 6H_2O$). A promoter compound can be impregnated separately from any cobalt, in a separate step. Alternatively, a promoter compound can be impregnated simultaneously with, e.g. in the same solution as, at least a portion of the catalytic metal.

When a catalyst material is impregnated as a precursor of the material, e.g. a salt or a zero valent compound, those skilled in the art will be able to select suitable precursors.

By way of example and not limitation, suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Suitable rhenium-containing precursor compound soluble in water are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6 \circ Cl_3$, $Ru(III)2,4$-pentanedionate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor can be soluble in an organic solvent, such as platinum acetyl acetonate soluble in acetone.

Suitable boron-containing precursor compounds soluble in water include, for example, boric acid and the like. Alternatively, the boron-containing precursor can be soluble in an organic solvent.

Suitable silver-containing precursor compounds soluble in water include, for example, silver nitrate ($AgNO_3$) and the like. Alternatively, the silver-containing precursor can be soluble in an organic solvent.

Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

Suitable lithium-containing precursor compound are lithium nitrate ($LiNO_3$) and lithium carbonate ($Li_2CO_3$).

Suitable potassium-containing precursor compounds are potassium nitrate ($KNO_3$) and potassium hydrogencarbonate ($KHCO_3$).

In some preferred embodiments, at least a portion of the metal(s) of the catalytic metal component of the catalysts of the present invention is present in a reduced state (i.e., in the metallic state). Therefore, it is normally advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for about 0.5 to about 50 hours at a pressure of about 1 to about 75 atm. Pure hydrogen can be used in the reduction treatment. Moreover, a mixture of hydrogen and an inert gas such as nitrogen or a mixture of hydrogen and other gases as are known in the art, such as carbon monoxide and carbon dioxide, can be used in the reduction treatment. Reduction with pure hydrogen and reduction with a mixture of hydrogen and carbon monoxide are preferred. The amount of hydrogen may range from about 1% to about 100% by volume.

FISCHER-TROPSCH SYNTHESIS

The feed gases charged to the Fischer-Tropsch process comprise hydrogen, or a hydrogen source, and carbon monoxide. $H_2$/CO mixtures suitable as a feedstock for conversion to hydrocarbons according to the process of this invention can be obtained from light hydrocarbons, such as methane or hydrocarbons comprised in natural gas, by means of steam reforming, auto-thermal reforming, dry reforming, advanced gas heated reforming, partial oxidation, catalytic partial oxidation, or other processes known in the art. Alternatively, the $H_2$/CO mixtures can be obtained from biomass and/or from coal by gasification. In addition, the feed gases can comprise off-gas recycle from the present of another Fischer-Tropsch process. Preferably, the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67 to about 2.5). Preferably, when cobalt, nickel, and/or ruthenium catalysts are used, the feed gas stream contains hydrogen and carbon monoxide in a molar ratio of about 1.4:1 to about 2.3:1. Preferably, when iron catalysts are used, the feed gas stream contains hydrogen and carbon monoxide in a molar ratio between about 1.4:1 and about 2.2:1. The catalyst may be supported by titania, zirconia, silica, alumina, thoria, ceria, and mixtures thereof. Preferably, the support comprises the aluminum-modified alumina of the present invention. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The feed gas is contacted with the catalyst in a reaction zone. Mechanical arrangements of conventional design may be employed as the reaction zone including, for example, fixed bed, fluidized bed, slurry bubble column or ebullating bed reactors, among others. Plug flow, fluidized bed, reactive distillation, ebulliating bed, and continuous stirred tank reactors have been delineated in "Chemical Reaction Engineering," by Octave Levenspiel, and are known in the art, as are slurry bubble column. A preferred slurry bubble column is described in co-pending commonly assigned U.S. patent application Ser. No. 10/193,357, hereby incorporated herein by reference in its entirety. Accordingly, the preferred size and physical form of the catalyst particles may vary depending on the reactor in which they are to be used.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C., more preferably from about 205° C. to about 230° C. The reaction zone pressure is typically in the range of about 80 psia (552 kPa) to about 1,000 psia (6,895 kPa), more preferably from 80 psia (552 kPa) to about 800 psia (5,515 kPa), and still more preferably, from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly used for making hydrocarbons having five or more carbon atoms, especially when the above-referenced preferred space velocity, temperature and pressure ranges are employed. More preferably, the hydrocarbon product comprises hydrocarbons having primarily at least 9 carbons. The hydrocarbon product comprises a wide range of hydrocarbons including gaseous, liquid, and/or solid hydrocarbons.

The hydrocarbon products having five or more carbon atoms can be fed into a fractionation unit. Typically, a stripping column is employed first to remove light hydrocarbons such as propane and butane. The remaining hydrocarbons can be passed into a distillation column in which they are separated by boiling point range into products such as naphtha, middle distillates comprising diesel and kerosene, and hydrocarbon waxes. Hydrocarbons (typically hydrocarbon waxes) recovered from the reaction zone and having a boiling point above that of the desired products can be passed into conventional hydroprocessing equipment such as a hydrocracking zone in order to reduce their molecular weight to that of desired products such as middle distillates and naphtha. The gas phase recovered from the reactor zone can be partially recycled if it contains a sufficient quantity of hydrogen and/or carbon monoxide.

Both FIGS. 1 and 2 demonstrate that applying to a gamma-alumina a modifying agent comprising an element for which its atomic volume approaches that of aluminum, and/or for which one element oxide has a molecular volume equal or less than that of aluminum oxide, would result in obtaining a stabilized alumina support suitable for use under hydrothermal conditions such as those employed in the hydrocarbon synthesis process. It should be understood that the teaching of this invention is not solely applicable to alumina supports. The same method may be applied for the stabilization of some other inorganic oxides, wherein the method includes a calcination of an inorganic oxide comprising an element in the presence of a modifying agent precursor comprising the same element may result in stabilization of said inorganic oxide. The stabilization of this inorganic oxide support by this method may result in obtaining a defect-reduced surface of some of the inorganic oxides, and therefore the stabilized inorganic oxide support would be suitable for an application in which a defect-reduced surface would be desirable, i.e., as a catalyst suitable to modify catalytic material/support interactions, or as a membrane material, for control of the permeation properties.

For purposes of the present disclosure, certain terms are intended to have the following meanings.

"Active metal" refers to any metal that is present on a catalyst that is active for catalyzing a particular reason. Active metals may also be referred to as catalytic metals.

A "promoter" is one or more substances, such as a metal or a metal oxide or metal ion that enhances an active metal's catalytic performance in a particular process, such as the Fischer-Tropsch process. Suitable measures of the performance that may be enhanced include product(s) selectivity, reactant(s) conversion, stability, lifetime, reducibility and resistance to potential poisoning by impurities such as sulfur, nitrogen, and oxygen. In some instances, a particular promoter may additionally provide another function, such as aiding in dispersion of active metal.

A "modifying agent" comprises at least one element, (whether in elemental form, in oxide form, or in ionic form) that modifies at least one physical property of the support material that it is deposited onto, such as improving mechanical strength, attrition resistance, hydrothermal stability, thermal stability, and/or changing morphology (pore size, volume, and surface area). It is theorized, without wishing to be limited to this theory, that the mode of stabilization of the modifying agent may be by changing the atomic arrangement in the alumina crystal lattice especially within the alumina outer surface layer i.e., blocking its defect sites so as to create an alumina outer surface with less defects. Therefore, a catalyst made from a modified catalyst support may have an enhanced performance. It will be understood that, as contemplated herein, an enhanced performance of a catalyst made from a modified catalyst support can be calculated according to any suitable method known to one of ordinary skill in the art. In particular, an enhanced performance can be given as a percent and computed as the ratio of the performance difference to the performance of a reference catalyst made from an unmodified catalyst support. The performance difference is between the performance of the improved catalyst and the reference catalyst, wherein the reference catalyst is a similar corresponding catalyst having the nominally same amounts, e.g. by weight percent, of all components except the composition of the support. It will further be understood that as contemplated herein a performance can be measured in any suitable units. For example, when the performance is productivity, productivity can be measured in grams product per hour per liter reactor volume, grams product per hour per kilogram catalyst, and the like.

With respect to the catalytic reaction such as the conversion of synthesis gas to hydrocarbons, references to "catalyst stability" refer to maintenance of at least one of the following criteria: level of conversion of the reactants, productivity, selectivity for the desired products, physical and chemical stability of the catalyst, lifetime of the catalyst on stream, and resistance of the catalyst to deactivation.

A precursor or a compound of an element (e.g., a catalytic metal, a catalytic promoter, or a modifying agent) is a chemical entity that contains the atoms of the element. The precursor or a compound of an element may comprise the element in an oxidation state that is not zero, such as, for example, a salt comprising such element or may comprise the element in a zero oxidation state.

To further illustrate various illustrative embodiments of the present invention, the following examples are provided.

EXAMPLE 1

A commercial gamma-alumina ($\gamma$-$Al_2O_3$) support Puralox® SCCa 5/150 was purchased from Sasol. The $\gamma$-$Al_2O_3$ spheres had the following characteristics: a size in the range of 20 to 250 microns (average diameter of 80 microns), a bulk density of 1.2 g/ml, an average surface area and an average pore volume measured with $N_2$ adsorption of 140 $m^2$/g and 0.50 ml/g, respectively. The $Al_2O_3$ spheres were calcined in a muffle furnace at 750° C. for 5 hours. This calcined support was used as a reference material and called Example 1.

EXAMPLES 2–8

Preparation of Aluminum-Modified Alumina Supports

EXAMPLE 2

$Al_2O_3$ Modified Under Acidic Conditions (Nitric Acid)

$Al_2O_3$ spheres described above were washed with a 1 M solution of nitric acid. The material was filtered using a Buchner funnel until all visible acidic solution was gone. The spheres were then washed with deionized water. The water washing was in the amount of three times the volume of the acid used in the primary step. After complete filtering from water, the carrier was calcined in a muffle furnace at 750° C. for 5 hrs.

EXAMPLE 3

$Al_2O_3$ Modified Under Basic Conditions (Ammonium Hydroxide)

The $Al_2O_3$ spheres described above were washed with a 1 M solution of ammonium hydroxide. The material was filtered using a Buchner funnel until all visible basic solution was gone. The spheres were then washed with deionized water. The water washing was in the amount of three times the volume of the base used in the primary step. After complete filtering from water, the carrier was calcined in a muffle furnace at 750° C. for 5 hrs.

EXAMPLE 4

Aluminum-Modified $Al_2O_3$ With Aluminum Acetate/Stabilized With Boric Acid

The $\gamma$-$Al_2O_3$ spheres described above were impregnated with an aqueous solution of aluminum acetate basic stabilized with boric acid containing a desired amount of aluminum so that the additional aluminum amount in the final material after calcination is approximately 5% by weight. The $Al_2O_3$ spheres impregnated with $CH_3CO_2Al(OH)_2$—⅓ $H_2BO_3$ solution were calcined in a muffle furnace at 750° C. for 5 hours. The $Al_2O_3$ spheres modified by aluminum acetate basic were used directly as catalyst support.

EXAMPLE 5

Aluminum-Modified $Al_2O_3$ With Aluminum Lactate

The $\gamma$-$Al_2O_3$ spheres described above were impregnated with an aqueous solution of aluminum lactate containing a desired amount of aluminum so that the additional aluminum amount in the final material after calcination is approximately 5% by weight. The $Al_2O_3$ spheres impregnated with $(CH_3CH(OH)CO_2)_3Al$ solution were calcined in a muffle furnace at 750° C. for 5 hours. The $Al_2O_3$ spheres modified by aluminum lactate were used directly as catalyst support.

EXAMPLE 6

Aluminum-Modified $Al_2O_3$ With Aluminum Nitrate

The $\gamma$-$Al_2O_3$ spheres described above were impregnated with an aqueous solution of aluminum nitrate nonahydrate containing a desired amount of aluminum so that the additional aluminum amount in the final material after calcination is approximately 3% by weight. The $Al_2O_3$ spheres impregnated with $Al(NO_3)$ solution were calcined in a muffle furnace at 750° C. for 5 hours. The $Al_2O_3$ spheres modified by aluminum nitrate were used directly as catalyst support.

EXAMPLE 7

Aluminum-Modified $Al_2O_3$ With Aluminum Nitrate $\gamma$-$Al_2O_3$ spheres described above were impregnated with an aqueous solution of aluminum nitrate nonahydrate containing a desired amount of aluminum so that the additional aluminum amount in the final material after calcination is approximately 5% by weight. The $Al_2O_3$ spheres impregnated with $Al(NO_3)$ solution were calcined in a muffle furnace at 750° C. for 5 hours. The $Al_2O_3$ spheres modified by aluminum nitrate were used directly as catalyst support.

EXAMPLE 8

Aluminum-Modified $Al_2O_3$ With Aluminum Nitrate

The $\gamma$-$Al_2O_3$ spheres described above were impregnated with an aqueous solution of aluminum nitrate nonahydrate containing a desired amount of aluminum so that the additional aluminum amount in the final material after calcination is approximately 5 % by weight. The $Al_2O_3$ spheres impregnated with $Al(NO_3)$ solution were calcined in a muffle furnace at 900° C. for 5 hours. The $Al_2O_3$ spheres modified by aluminum nitrate were used directly as catalyst support.

The BET surface area, pore volume, and average pore diameter of the supports of examples 1 through 7 with various treatment procedures were determined from $N_2$ adsorption-desorption isotherms at 77 K on Micromeritics ASAP 2000 equipment. Results are shown in Table 1.

TABLE 1

Properties of Supports

| Support Example | Treatment procedures of support | Calcination Temperature, ° C. | BET Surface Area, $m^2/g$ | Pore Volume, cc/g | Average Pore Diameter, nm |
|---|---|---|---|---|---|
| $\gamma$-$Al_2O_3$ | n/a | — | 137 | 0.48 | 14.0 |
| 1 | n/a | 750 | 132 | 0.47 | 14.2 |
| 2 | acid treatment | 750 | 135 | 0.49 | 14.5 |
| 3 | base treatment | 750 | 147 | 0.49 | 13.3 |
| 4 | 5% Al acetate/ $H_3BO_3$ | 750 | 134 | 0.43 | 12.8 |
| 5 | 5% Al lactate | 750 | 128 | 0.43 | 13.4 |
| 6 | 3% $Al(NO_3)_3$ | 750 | 124 | 0.44 | 14.2 |
| 7 | 5% $Al(NO_3)_3$ | 750 | 122 | 0.44 | 14.4 |
| 8 | 5% $Al(NO_3)_3$ | 900 | 114 | 0.42 | 14.7 |

From Table 1, it can be seen that modifying the support with an aluminum modifying agent does not seem to change the surface area significantly but appeared to reduce slightly the pore volume and pore diameter of the supports over the supports that are not modified with aluminum. By comparing Example 8 to Example 7, a higher calcination of 900° C. compared to 750° C. resulted in a BET surface area loss of about 8 $m^2/g$. The unmodified alumina of Example 2 (which was treated with acid and not modified by a modifying agent) resulted in a similar morphology as Example 1, which comprises gamma-alumina not treated with acid. Therefore, an acid treatment of a gamma-alumina material did not seem to affect the alumina support morphology. On the other end, the unmodified alumina of Example 3 (which was treated with a base and not modified by a modifying agent) resulted in an increase in BET of 15 $m^2/g$ and a reduction in pore diameter of about 1 nm as compared to Example 1.

EXAMPLES 9–15

Preparation of Catalysts

EXAMPLE 9

The catalyst Example 9 was made using a multi-step incipient wetness impregnation method. A solution was prepared by dissolving cobalt nitrate hexahydrate $[Co(NO_3)_2 \cdot 6H_2O]$, tetraammine platinum nitrate $[(NH_3)_4Pt(NO_3)_2]$ and boric acid $[H_3BO_3]$ in deionized water. The support according to Example 2 was impregnated using a portion of the solution prepared above to achieve incipient wetness. The prepared catalyst was then dried for 16 hours in an oven at a temperature of 100° C. The dried catalyst was then calcined in air in a calcining chamber by raising the temperature of the calcining chamber at a heating rate of 1° C./min up to 120° C. and holding at this temperature for 1 hour. The temperature was then raised at 1° C./min up to 300° C. and held at this temperature for 5 hours. The above procedure (impregnation, drying, and calcining) was repeated to achieve a nominal composition of 25 weight % Co, 0.03 weight % Pt and 0.5 weight % B, which were calculated as the percent of the total weight of the catalyst. The catalyst is processed in such a manner that drying and calcination, as indicated above, is performed after each impregnation step.

EXAMPLE 10–15

The catalysts were made similarly to Example 9 except that the support of each Example 3–8 was used respectively.

Scanning electron microscopy using conventional techniques was performed on the catalysts of Examples 9–15. Table 2 lists the BET surface area, pore volume, and average pore diameter of such examples.

The BET surface area, average pore volume, and average port diameter were measured by the BJH desorption method using $N_2$ as the adsorptive material of catalysts and supports. Surface area and pore size distribution were obtained on a Micromeritics TriStar 3000 analyzer after degassing the sample at 190° C. in flowing nitrogen for five hours. Surface area was determined by taking ten points in the nitrogen adsorption isotherm between 0.05 and 0.3 relative pressure and by calculating the surface area by the standard BET procedure. Pore size distribution was determined from a minimum of 30 points in the nitrogen desorption isotherm and calculated using the BJH model for cylindrical pores. The instrument control and calculations were performed using the TriStar software and are consistent with ASTM D3663-99 entitled "Surface Area of Catalysts and Catalyst Carriers," ASTM D4222-98 entitled "Determination of Nitrogen Adsorption and Desorption Isotherms of Catalysts by Static Volumetric Measurements," and ASTM D4641-94 entitled "Calculation of Pore Size Distributions of Catalysts from Nitrogen Desorption Isotherms." The initial surface area (A) of the catalyst was determined as the surface area of the catalyst structure prior to contact of reactant gas. The average pore volume (V) of the catalyst ($N_2$ as adsorptive material) was measured and calculated using the method described above. Average pore size (diameter) was calculated as 4V/A.

TABLE 2

Catalyst Properties

| Cat. Ex. | Supp. Ex. | Treatment procedures of support | BET Surface Area, m²/g | Pore Volume, cc/g | Average Pore Diameter, nm |
|---|---|---|---|---|---|
| 9 | 2 | acid treatment; 750° C. calcination | 81 | 0.23 | 11.3 |
| 10 | 3 | base treatment; 750° C. calcination | 92 | 0.27 | 11.7 |
| 11 | 4 | 5% Al acetate/$H_3BO_3$; 750° C. calcination | 87 | 0.21 | 9.6 |
| 12 | 5 | 5% Al lactate; 750° C. calcination | 85 | 0.22 | 10.4 |
| 13 | 6 | 3% $Al(NO_3)_3$; 750° C. calcination | 114 | 0.42 | 14.7 |
| 14 | 7 | 5% $Al(NO_3)_3$; 750° C. calcination | 79 | 0.22 | 11.1 |
| 15 | 8 | 5% $Al(NO_3)_3$; 900° C. calcination | 76 | 0.22 | 11.6 |

EXAMPLE 16

Steaming Test for Hydrothermal Stability of Supports

The hydrothermal stability of catalyst supports of Examples 2–4, 6 and 8 as well as the catalysts of Examples 11, 13, and 15 was determined using a steaming test.

The steaming test comprised exposing a 1-g sample to about 15 g of water in an autoclave at a temperature of 225° C. and a pressure of 375 psig (approximating the Fischer-Tropsch operating conditions) for 2 hours. The sample was cooled down to room temperature (about 18–20° C.) and then dried at about 80° C. for about 5 hours. Two samples (before and after steam treatment) were then analyzed for changes in surface area and pore size (average pore volume and diameter). Both samples were measured by the BJH desorption method as described above.

The results for (unmodified) calcined support Example 1, acid and base treated support Examples 2 and 3, and aluminum-modified supports Examples 4, 6, and 8 are shown in Table 3.

Table 3 shows the average pore volume, average pore diameter and BET surface area before and after steaming, as well as the relative change in percent (increase or decrease) in average pore volume, average port diameter and BET surface area, which were all calculated by the following formula:

$$\% \text{ change} = \frac{(\text{value before steam test} - \text{value after steam test})}{(\text{value before steam test})}$$

A positive (negative) % change indicates a decrease (increase) in a specific property, and a 0% value indicates no change in the specific property after the steaming test.

All three support catalyst EXAMPLES 4, 6, and 8 modified by a modifying agent comprising aluminum showed better conservation (least amount of change) in average pore volume, average pore diameter and BET surface area, after the steaming test, than the unmodified support Example 1 derived from the same gamma-alumina material but calcined without a modifying agent. Hence, modification of the gamma-alumina material with an aluminum salt resulted in a catalyst support with improved hydrothermal stability.

TABLE 3

Steaming test results on alumina support Examples 1–4, 6 and 8

| Supp. Ex. | Modification and/or other treatment | Calc. Temp., ° C. | BET m2/g Prior steam | After steam | % | Avg.Pore Vol. cc/g Prior steam | After steam | % | Avg.Pore Dia., nm Prior steam | After steam | % |
|---|---|---|---|---|---|---|---|---|---|---|---|
| γ-$Al_2O_3$ | none | — | 137 | 59 | 57 | 0.48 | 0.37 | 23 | 14 | 25 | −79 |
| Ex. 1 | none | 750 | 132 | 73 | 45 | 0.47 | 0.37 | 21 | 14 | 20 | −42 |
| Ex. 2 | None + acid treatment | 750 | 135 | 46 | 66 | 0.49 | 0.35 | 29 | 14 | 31 | −121 |
| Ex. 3 | None + base treatment | 750 | 147 | 116 | 21 | 0.49 | 0.24 | 51 | 13 | 10 | 23 |

TABLE 3-continued

Steaming test results on alumina support Examples 1–4, 6 and 8

| Supp. Ex. | Modification and/or other treatment | Calc. Temp., °C. | BET m2/g | | | Avg.Pore Vol. cc/g | | | Avg.Pore Dia., nm | | |
|---|---|---|---|---|---|---|---|---|---|---|---|
| | | | Prior steam | After steam | % | Prior steam | After steam | % | Prior steam | After steam | % |
| Ex. 4 | 5% Aluminum acetate | 750 | 134 | 146 | −9 | 0.43 | 0.40 | 7 | 13 | 11 | 15 |
| Ex. 6 | 3% aluminum nitrate | 750 | 124 | 125 | 0.8 | 0.44 | 0.39 | 11 | 14.8 | 12.4 | 11 |
| Ex. 8 | 5% Aluminum nitrate | 900 | 114 | 78 | 32 | 0.42 | 0.34 | 19 | 14.8 | 17.2 | −16 |

EXAMPLE 17

Stream Testing of Alumina Supports Modified With Conventionally-Used Modifying Agents The γ-$Al_2O_3$ spheres described above were impregnated with a solution of one of six conventionally used modifying agents comprising an element from cobalt, magnesium, silicon, selenium, lanthanum, and cerium. The modifying agent precursors comprised nitrate salts of these elements, except for silicon, for which silicic acid was employed. The solution contained a desired amount of the modifying agent so that the modifying agent amount in the final material after calcination is approximately 2% by weight. The $Al_2O_3$ spheres impregnated with the solution containing the precursor of the modifying agent were calcined in a muffle furnace at 750° C. for 5 hours.

The alumina supports modified by these six conventionally used modifying agents were submitted to the same steam test as described earlier and compared to that of the aluminum-modified alumina support Example 6 (which was prepared by the same method and modified with 3% aluminum from aluminum nitrate). The change in surface area in the steaming test was reported versus the atomic volume of the element (Co, Al, Mg, Co, Si, Se, Ce, La) in Table 4. The atomic weight, density, and the atomic volume of each element, as well as the absolute change (in percent) in BET surface area are listed in Table 4.

The atomic volume of each element (Al, Co, Si, Mg, Se, La, and Ce) was calculated as the ratio of the element atomic weight by the element density. The atomic weights and densities of the elements (Al, Co, Si, Mg, Se, La, and Ce) can be found in CRC Handbook of Chemistry and Physics, 81$^{rst}$ Edition, D. R. Lide, Ed. CRC Press, Inc., 2000–2001, page 4–39 for Al; page 4–52 for Ce; page 4–54 for Co; page 4–66 for La; page 4–69 for Mg; page 4–84 for Se; and page 4–84 for Si.

TABLE 4

Hydrothermal stability of alumina supports modified by one modifying agent comprising one element from Al, Co, Si, Mg, Se, La, and Ce

| Modifying agent comprising these elements | Characterisitics of Elements | | | BET m²/g | | |
|---|---|---|---|---|---|---|
| | Atomic weight, g/mol | Density, g/cm³ | Atomic volume, cm³/mol | Prior steam | After Steam | % (absolute) |
| Al (Ex. 6) | 26.982 | 2.70 | 10.0 | 124 | 125 | 0.8 |
| Co | 58.933 | 8.86 | 6.65 | 130 | 134 | 3.1 |
| Si | 28.086 | 2.33 | 12.06 | 137 | 135 | 1.5 |
| Mg | 24.305 | 1.74 | 13.97 | 130 | 128 | 1.5 |
| Se | 28.96 | 4.81 | 16.42 | 134 | 119 | 11.2 |
| Ce | 140.12 | 6.77 | 20.70 | 126 | 95 | 24.6 |
| La | 138.91 | 6.15 | 22.59 | 132 | 78 | 40.9 |

The resulting change in BET surface area after the steaming test appears to be related to the atomic volume of the element comprised in the modifying agent, which is used to modify the alumina. An atomic volume of an element between 6.65 cm³/mol and 13.97 cm³/mol resulted in maintenance in surface area under hydrothermal conditions (a BET change less than 3.1%), with the modifying agent comprising aluminum being the most stable. But an atomic volume greater than 16.4 cm³/mol seems to affect greatly the hydrothermal stability of the modified alumina matrix.

This phenomenon is further illustrated in FIG. 1, wherein the change in BET surface area (in absolute value) after a steaming test is plotted with respect to the difference in atomic volume (in cm³/mol) between the conventionally used modifying elements and aluminum. It is observed that, as the difference in atomic volumes approaches 0 (i.e., aluminum), the less change in surface area was observed. Therefore, an atomic volume of a modifying element should be within about +/−4 cm³/mol of the aluminum atomic volume (or a modifying element atomic volume of about 6–14 cm³/mol), preferably between about +/−2 cm³/mol (or a modifying element atomic volume of about 8–12 cm³/mol), more preferably between about +/−1 cm³/mol (or a modifying element atomic volume of about 9–11 cm³/mol).

When a modifying agent comprising aluminum or other elements is applied to alumina, then dried and calcined, the fate of the aluminum or other elements (derived from the modifying agent) in the modified alumina matrix is not clearly known. It is possible that the added aluminum atoms are inserted into the alumina matrix (for example in the defect sites of the alumina surface) or that some aluminum oxide species may be newly formed to modify the starting alumina material, especially its surface. Therefore, since the mode of stabilization of aluminum may result from the new formation of element oxides on the initial gamma-alumina material, the data obtained for the elements on steaming were also listed with respect to the molecular volume of the stable oxides of these elements. Table 5 lists the molecular weight, density and 'molecular' volumes of elements oxides (for the following elements: Al, Co, Si, Mg, Se, La, and Ce) that may be formed during the preparation of the catalyst supports. The molecular weight, density and "molecular" volumes of the elements oxides can be found in CRC Handbook of Chemistry and Physics, 81$^{rst}$ Edition, D. R. Lide, Ed., CRC Press, Inc., 2000–2001, page 4–40 for $Al_2O_3$; page 4–52 for $Ce_2O_3$; page 4–55 for CoO; page 4–66 for $La_2O_3$; page 4–70 for MgO; page 4–84 for $SeO_2$; and page 4–85 for $SiO_2$. The results are also illustrated in FIG. 2.

TABLE 5

| Element oxides derived from modifying agent precursors | Molecular weight, g/mol | Density, g/cm$^3$ | Molecular volume, cm$^3$/mol | BET Change % (in absolute value) |
| --- | --- | --- | --- | --- |
| $Al_2O_3$ | 101.96 | 3.97 | 25.7 | 0.8 |
| CoO | 74.93 | 6.44 | 11.64 | 3.1 |
| $SiO_2$ | 60.09 | 2.65 | 22.7 | 1.5 |
| MgO | 40.30 | 3.60 | 11.20 | 1.5 |
| $SeO_2$ | 110.96 | 3.95 | 28.1 | 11.2 |
| $Ce_2O_3$ | 328.2 | 6.20 | 52.9 | 24.6 |
| $La_2O_3$ | 325.8 | 6.51 | 50.1 | 40.9 |

If it is assumed that the element comprised in the modifying agent is transformed into an oxide of that element during the preparation of the support, the results in Table 5 seem to indicate that the molecular volume of the element oxide (which may be derived from the modifying agent comprising said element and used to modify the starting alumina material) may be a determining factor in achieving good hydrothermal stability in the modified alumina support. When the data is illustrated in FIG. 2, it is noticeabe that a small change in BET surface area after the steaming test was observed with elements (Co, Si, Mg, and Al), which have a molecular volume of their corresponding element oxide between 10 and 25.7 cm$^3$/mol, i.e., equal to or lower than that of aluminum oxide. On the other end, when the modifying agent comprised an element, whose element oxide could have a molecular volume exceeding that of aluminum oxide (greater than ca. 25.7 cm$^3$/mol), the modified alumina support showed poorer maintenance of its surface area under hydrothermal conditions (a BET change greater than 10%). Thus, an element with a corresponding element oxide of a molecular volume greater than 25.7 cm$^3$/mol appears less suited for hydrothermal stabilization of alumina. Hence, it is believed that a modifying element comprising any element, for which an element oxide with a molecular volume less or equal to that of aluminum oxide (ca. 25.7 cm$^3$/mol) can be formed during preparation of the modified alumina support, could be selected in order to achieve good hydrothermal stability in the modified alumina support.

EXAMPLE 18

Catalytic Performance in a Fixed Bed

Reduction of Catalysts Before Testing in a FT Reactor

Each catalyst sample of Examples 9–15 were treated with hydrogen prior to use in the Fischer-Tropsch reactor. The catalyst sample was placed in a quartz tube and located in a furnace oriented to simulate a fluidized bed. The catalyst sample was then heated under 700 cc/min hydrogen flow at 1° C./minute to 120° C. and held at 120° C. for one hour. The catalyst sample was then heated at 1° C./minute to 400° C. and held at 400° C. for ten hours under 700 cc/min hydrogen flow. The sample was cooled under hydrogen and transported to a nitrogen-controlled environment. The catalyst was measured out and placed under a hydrocarbon liquid to maintain a reduced metal state and transferred to the reactor.

Fischer-Tropsch Performance in Fixed Bed Reactor

The catalysts of Examples 9–15 were tested in a laboratory fixed bed reactor. Each catalyst was activated in situ by heating the catalyst to 350° C. with a heating rate of 2° C./min and holding at 350° C. for 16 hours in flowing hydrogen gas at 600 sccm (standard cubic centimeter per minute). The reaction conditions included a temperature of 220° C., a pressure of 350 psig (2,515 KPa), a space velocity of 6 normal liters per hour per gram catalyst, and a molar hydrogen to carbon monoxide ratio in the feed stream of about 2.0. The carbon monoxide conversion (in mole %), the C5+ productivity (in g C5+/h/kg catalyst), and the methane (Cl) weight percent as a weight % of hydrocarbon product were measured at different reaction times on stream (TOS). Results are reported in Table 6.

TABLE 6

Laboratory Fixed-Bed Fischer-Tropsch Synthesis Performance

| Catalyst | TOS, h | CO Conversion, % | Cl, wt. % | C5 + Productivity, g/h/kgcat |
| --- | --- | --- | --- | --- |
| Example 9 | 24 | 49.4 | 8.4 | 502.9 |
|  | 96 | 37.7 | 9.2 | 375.4 |
| Example 10 | 24 | 56.5 | 8.0 | 574.3 |
|  | 96 | 53.8 | 8.4 | 537.8 |
| Example 11 | 24 | 38.4 | 8.4 | 394 |
|  | 48 | 63.1 | 8.7 | 642.3 |
|  | 72 | 59.6 | 8.8 | 604.2 |
|  | 96 | 57.0 | 8.9 | 577.3 |
| Example 12 | 24 | 43.7 | 9.1 | 439.2 |
|  | 48 | 64.0 | 9.3 | 638.5 |
|  | 72 | 57.6 | 9.9 | 570.3 |
|  | 96 | 54.5 | 10.1 | 537.5 |
| Example 13 | 24 | 29.2 | 9.4 | 288.1 |
|  | 48 | 75.7 | 9.7 | 736.8 |
|  | 72 | 66.0 | 10.0 | 640.4 |
|  | 96 | 62.4 | 10.0 | 604.0 |
| Example 14 | 24 | 38.1 | 8.4 | 388.8 |
|  | 48 | 67 | 8.5 | 674.8 |
|  | 72 | 63.8 | 8.7 | 640.3 |
|  | 96 | 61.6 | 8.8 | 618.2 |
| Example 15 | 24 | 55.1 | 7.7 | 566.4 |
|  | 48 | 83.2 | 8.2 | 836.1 |
|  | 72 | 76.0 | 8.3 | 762.6 |
|  | 96 | 73.8 | 8.3 | 740.8 |

EXAMPLE 19

Catalytic Performance in a Continuous Stirred Reactor

Activation of Catalyst Before Testing in a Continuous Stirred Reactor

The catalyst of Example 13 underwent a high-temperature activation step prior to reaction using the following procedure: a known weight of the catalyst was loaded in a 1 in. OD sample tube. The tube was heated to 120° C. under nitrogen flow (1,000 cc/min & 40 psig) at a rate of 1.5°

C./min. The tube was maintained at 120° C. under these conditions for two hours for drying of the catalyst. At the end of the drying period, the flow was switched from nitrogen to hydrogen. The tube was heated under hydrogen flow (1,000 cc/min and 40 psig) at a rate of 1.4° C./min to a temperature of about 400° C. The tube maintained at about 400° C. under these conditions for 16 hours for catalyst reduction. At the end of the reduction period, the flow was switched back to nitrogen and the tube cooled to room temperature.

Fischer-Tropsch Performance in Continuous Stirred Reactor

A heavy hydrocarbon wax with an average molecular weight of 1,200 was loaded in a continuous flow stirred tank reactor (CSTR). The reactor was a 1 liter stainless-steel stirred autoclave equipped with two stirrers on a single shaft. The bottom stirrer was a gas-entrainment impeller, while the top stirrer was a pitched turbine impeller. Feed gases were introduced to the reactor at the bottom of the reactor, just below the bottom stirrer. The feed flow rates of carbon monoxide, hydrogen, and nitrogen were individually controlled by mass flow controllers. The products of reaction as well as unreacted gases were analyzed by either on-line or off-line gas chromatographs.

The reactor was heated to 120° C. to melt the solid start-up wax, sealed, the stirrer was started at 1,000 rpm and a nitrogen flow rate of 1,000 cc/min was started. A tube containing the activated catalyst of Example 13 was attached to the reactor head and the catalyst was transferred to the reactor under a nitrogen atmosphere.

The catalyst was pre-treated in slurry in the CSTR reactor before reaction. The gas flow was switched to hydrogen, and the reactor was heated to 280° C. at a rate of 2° C./min. The reactor was maintained at this temperature for 16 hours. At the end of this step, the reactor was cooled to the desired reaction temperature (usually 225° C.) and pressurized to the desired reaction pressure (usually 350 psig). Synthesis gas, with a 2:1 $H_2$/CO ratio, was then fed to the reactors when reaction conditions had been reached.

A material balance period lasted for between 16 to 24 hours. Total run times on these catalysts were about 170 hours. During the material balance period, data was collected for feed syngas and exit uncondensed gas flow rates and compositions, weights and compositions of aqueous and organic phases collected in wax and cold traps, and reaction conditions such as temperature and pressure. The information collected was analyzed to get a total as well as individual carbon, hydrogen and oxygen material balance. From this information, it was possible to obtain CO conversion (%), $C_1$ selectivity, $C_{5+}$ productivity (g $C_{5+}$HC/hr/kgcat), weight percent $CH_4$ in hydrocarbon products (wt%) as a function of time on stream (TOS, hr) as well as the hydrocarbon products selectivity defined as the alpha value ($\alpha$), which are shown in Table 7.

TABLE 7

Laboratory CSTR Fischer-Tropsch Synthesis Performance

| Catalyst | Alpha value | TOS, hr | CO Conv., % | $C_1$ selectivity, wt. % | $C_{5+}$, g/hr/kgcat |
|---|---|---|---|---|---|
| Example 13 | 0.9 | 30 | 49 | 6.5 | 794 |
|  |  | 102 | 46 | 6.8 | 745 |
|  |  | 126 | 44 | 6.9 | 719 |
|  |  | 150 | 43 | 7.2 | 696 |
|  |  | 174 | 42 | 7.3 | 683 |

As shown in Tables 6 and 7, catalysts comprising aluminum-modified alumina supports have enhanced conversion, $C_1$ selectivity, and $C_{5+}$ hydrocarbon productivity. Such results show that the catalyst compositions of the present invention represent an improvement over prior art catalysts in their ability to resist deactivation over sustained time periods while maintaining high methane conversion and hydrogen and carbon monoxide selectivity values.

Although the present invention and its advantages have been described in detail, it should be understood that various changes, substitutions and alterations may be made herein without departing from the spirit and scope of the invention as defined by the appended claims.

The invention claimed is:

1. A method for producing hydrocarbons, comprising:
   providing a reactor having a catalyst comprising a hydrothermally stable modified alumina support;
   contacting a reactant gas comprising carbon monoxide and hydrogen with the catalyst to produce the hydrocarbons; and
   wherein the hydrothermally stable modified alumina support is made by a process comprising:
   (A) providing an alumina precursor;
   (B) depositing a modifying agent comprising an element from the Periodic Table with an atomic volume between about 6 and about 14 $cm^3$/mol onto the alumina precursor; and
   (C) calcining the deposited alumina precursor between 500° C. and 900° C. to form the hydrothermally stable modified alumina support.

2. The method of claim 1, wherein the hydrothermally stable modified alumina support comprises a transition alumina and at least one modifying agent comprising said element from the Periodic Table with an atomic volume between about 6 and about 14 $cm^3$/mol, and further wherein the depositing step (B) comprises depositing a precursor of the at least one modifying agent onto the transition alumina.

3. The method of claim 2, wherein the atomic volume of the element is between about 9 and about 11 $cm^3$/mol.

4. The method of claim 2, wherein the transition alumina comprises gamma-alumina.

5. The method of claim 2, wherein the element is aluminum.

6. The method of claim 5, wherein the at least one modifying agent comprises the form of a hydroxide, an ion, or mixtures thereof.

7. The method of claim 1, wherein the alumina precursor of step (A) comprises one or more transition alumina phases.

8. The method of claim 7, wherein the alumina precursor of step (A) comprises one or more transition phases selected from gamma, delta, kappa, eta, chi, rho, and theta.

9. The method of claim 1, wherein step (A) further comprises pre-treating the alumina precursor.

10. The method of claim 9, wherein pre-treating comprises spray drying, dehydrating, drying, steaming, or calcining.

11. The method of claim 1, wherein step (A) further comprises dispersing the alumina precursor in a solvent to form a sol.

12. The method of claim 11, wherein depositing the modifying agent onto the alumina precursor of step (B) further comprises depositing the modifying agent onto the sol.

13. The method of claim 12, wherein the sol is spray dried after depositing the modifying agent onto the sol.

14. The method of claim 1, wherein step (B) is accomplished by spray-drying, impregnation, co-precipitation, chemical vapor deposition, or plasma sputtering.

15. The method of claim 14, wherein impregnation comprises incipient wetness impregnation.

16. The method of claim 1, wherein the modifying agent of step (B) comprises aluminum.

17. The method of claim 1, wherein the modifying agent of step (B) comprises an aluminum salt, dispersible boehmite, dispersible pseudo-boehmite, or mixtures thereof.

18. The method of claim 17, wherein step (C) is accomplished at temperatures from 500° C. to about 800° C.

19. The method of claim 1, wherein step (B) further comprises depositing at least one additional modifying agent onto the alumina precursor.

20. The method of claim 1, wherein step (C) is accomplished at temperatures between 500 and about 800° C.

21. The method of claim 1, wherein the atomic volume of the element is between about 8 and about 12 $cm^3$/mol.

22. The method of claim 1, wherein the atomic volume of the element is between about 9 and about 11 $cm^3$/mol.

23. The method of claim 1, wherein the hydrothermally stable alumina support comprises an oxide of the element, and wherein the element oxide has a molecular volume lower than that of aluminum oxide.

24. The method of claim 23, wherein the element oxide has a molecular volume between about 10 and about 25.7 $cm^3$/mol.

25. The method of claim 1, wherein the alumina precursor comprises gamma-alumina.

26. The method of claim 1, wherein step (B) is accomplished by impregnation.

27. The method of claim 1, wherein step (C) is accomplished at temperatures between about 800° C. and 900° C.

28. A method of producing hydrocarbons, comprising:
(A) providing a reactor having a catalyst comprising an aluminum-modified alumina support; and
(B) contacting a reactant gas comprising carbon monoxide and hydrogen with the catalyst to produce the hydrocarbons,
wherein the aluminum-modified alumina support is modified by at least one modifying agent comprising aluminum by depositing a modifying agent precursor comprising an aluminum salt, an aluminum hydroxide, or mixtures thereof, to an alumina precursor, and calcining the deposited alumina precursor between 500° C. and 900° C.

29. The method of claim 28, wherein the hydrocarbons comprise primarily at least 9 carbons.

30. The method of claim 28, wherein the modifying agent precursor comprises dispersible boehmite, dispersible pseudo-boehmite, or mixtures thereof.

31. The method of claim 28, wherein the alumina support is further modified by at least one additional modifying agent.

32. The method of claim 28, wherein the catalyst comprises at least one promoter selected from the group consisting of platinum, palladium, ruthenium, rhenium, silver, boron, copper, lithium, sodium, potassium, magnesium, and combinations thereof.

33. The method of claim 28, wherein the catalyst of step (A) comprise a catalytically active metal comprising at least one metal selected from the group consisting of Group 8 metals, Group 9 metals, Group 10 metals, molybdenum, rhenium, and tungsten.

34. The method of claim 28, wherein the catalyst of step (A) comprises a catalytically active metal comprising at least one metal selected from the group consisting of cobalt, ruthenium, iron, nickel, and combinations thereof.

35. The method of claim 28, wherein the reactant gas of step (B) contains hydrogen and carbon monoxide in a molar ratio of from about 0.67:1 to about 2.5:1.

36. The method of claim 28, wherein the aluminum salt is selected from the group consisting of aluminum carbonate, aluminum acetate, aluminum acetyl acetonate, aluminum lactate, aluminum nitrate, aluminum chloride, aluminum oxalate, and mixtures thereof.

37. The method of claim 28, wherein the calcining step is accomplished at temperatures between 500 and about 800° C.

38. The method of claim 28, wherein the calcining step is accomplished at temperatures between 750 and 900° C.

39. The method of claim 28, wherein the aluminum-modified alumina support is made by a method comprising impregnating the modifying agent precursor to the alumina precursor.

40. The method of claim 39, wherein the aluminum hydroxide comprises boehmite, pseudo-boehmite, gibbsite, or mixtures thereof.

41. The method of claim 39, wherein the aluminum salt comprises aluminum nitrate, aluminum lactate, aluminum acetate, or combinations thereof.

42. The method of claim 28, wherein the alumina precursor comprises a transition alumina.

43. The method of claim 28, wherein the alumina precursor comprises gamma-alumina.

44. The method of claim 34, wherein the catalytically active metal comprises cobalt.

* * * * *